(12) United States Patent
Liu et al.

(10) Patent No.: US 7,291,319 B2
(45) Date of Patent: Nov. 6, 2007

(54) CARBON NANOTUBE-BASED DEVICE AND METHOD FOR MAKING THE SAME

(75) Inventors: Liang Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 276 days.

(21) Appl. No.: 11/200,824

(22) Filed: Aug. 10, 2005

(65) Prior Publication Data

US 2006/0035084 A1 Feb. 16, 2006

(30) Foreign Application Priority Data

Aug. 11, 2004 (CN) ........................ 2004 1 0051102

(51) Int. Cl.
*D01F 9/12* (2006.01)
*D01F 9/127* (2006.01)
(52) U.S. Cl. ............................... 423/447.2; 423/447.3; 977/742; 977/843
(58) Field of Classification Search ............. 423/447.2, 423/447.3; 977/742, 843
See application file for complete search history.

(56) References Cited

U.S. PATENT DOCUMENTS 6,232,706 B1  5/2001  Dai et al. .................... 313/309
7,060,356 B2 *  6/2006  Liu et al. .................... 428/408
7,147,831 B2 * 12/2006  Liu et al. .................. 423/447.2
7,161,286 B2 *  1/2007  Liu et al. .................... 313/311

OTHER PUBLICATIONS

Zhang et al., "Electric-Field-Directed Grown of Aligned Single-Walled Carbon Nanotubes," *Applied Physics Letters*, vol. 79, No. 19, pp. 3155-3157 (Nov. 2001).
Fan et al., "Self-Oriented Regular Arrays of Carbon Nanotubes and Their Field Emission Properties," *Science*, vol. 283, pp. 512-514 (Jan. 1999).
Ren et al., "Synthesis of Large Arrays of Well-Aligned Carbon Nanotubes on Glass," *Science*, vol. 282, pp. 1105-1107 (Nov. 1998).
Wei et al., "Organized Assembly of Carbon Nanotubes," *Nature*, vol. 416, pp. 495-496 (Apr. 2002).

* cited by examiner

*Primary Examiner*—Evan Pert
(74) *Attorney, Agent, or Firm*—Morris Maning Martin LLP; Tim Tingkang Xia, Esq.

(57) ABSTRACT

A preferred carbon nanotube-based device (1) includes a substrate (10), a catalyst layer (30) disposed on the substrate, and a plurality carbon nanotube arrays (50, 51) extending from the catalyst layer. The catalyst layer includes a plurality of catalyst blocks (33, 34), a thickness of the catalyst block is varied gradually from a first end thereof to an opposite second end thereof, and the catalyst block having a region with a thickness approximate to an optimum thickness for growing carbon nanotubes. The carbon nanotube arrays are arc-shaped, and bend in respective directions deviating from the region of optimum thickness. A preferred method for making the carbon nanotube-based device is also provided.

20 Claims, 5 Drawing Sheets

CARBON NANOTUBE-BASED DEVICE AND METHOD FOR MAKING THE SAME

BACKGROUND OF THE INVENTION

1. Field of the Invention

The present invention relates to carbon nanotube-based devices and methods for making such carbon nanotube-based devices.

2. Description of the Related Art

Carbon nanotubes are very small tube-shaped structures essentially having the composition of a graphite sheet rolled into a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58). Carbon nanotubes have very good electrical conductance due to their structure. They are also chemically stable, and have very small diameters (less than 100 nanometers) and large aspect ratios (length/diameter). Due to these and other properties, it has been suggested that carbon nanotubes can play an important role in fields such as microscopic electronics, materials science, biology and chemistry.

Although carbon nanotubes promise to have a wide range of applications, better control is needed over the building and organization of nanotube-based architectures. Normally, the orientation of growing nanotubes is controlled such that the nanotubes are rectilinear and parallel to each other. Chemical vapor deposition has been used to produce nanotubes vertically aligned on catalyst-printed substrates. A method for controlling the growth of aligned nanotubes in several directions on a substrate in a single process is reported in an article by B. Q. Wei et al. entitled "Organized Assembly of Carbon Nanotubes" (Nature Vol. 416, Apr. 4, 2002, pp. 495-496).

Another method for controlling the growth of carbon nanotubes by means of electric fields is reported in an article by Yuegang Zhang et al. entitled "Electric-Field-Directed Growth of Aligned Single-Walled Carbon Nanotubes" (Applied Physics Letters, Vol. 79, Nov. 5, 2001, pp. 19).

However, carbon nanotubes of all the carbon nanotube based structures obtained by the above-mentioned methods are aligned along a linear direction, and/or extend perpendicularly from the substrates. Furthermore, the method of using an external electric field to control a direction of growth of the carbon nanotubes is difficult to apply in generating localized complicated structures with plural orientations of the carbon nanotubes. Accordingly, the range of diversity of different kinds of carbon nanotube-based devices is limited.

What is needed, therefore, is a carbon nanotube-based device with plural orientations of the carbon nanotubes and a method for making the such device.

SUMMARY

In a preferred embodiment, a carbon nanotube-based device includes a substrate, a catalyst layer disposed on the substrate, and a plurality carbon nanotubes arrays extending from the catalyst layer. The catalyst layer includes a plurality of catalyst blocks. A thickness of each catalyst blocks is varied gradually along a predetermined direction on the substrate, and somewhere the catalyst block has a thickness approximately equal to an optimum thickness for growing carbon nanotubes. The carbon nanotube arrays bend to a direction deviating from the region of the optimum thickness.

In another embodiment, a method for making a carbon nanotube-based device includes the steps of: providing a substrate; forming a catalyst layer includes a plurality of blocks on the substrate, a thickness of the catalyst block is varied gradually from a first end to an opposite second end, and somewhere the catalyst block has a thickness approximately equal to an optimum thickness for growing carbon nanotubes; introducing a carbon source gas; and forming a plurality of carbon nanotubes arrays extending from the catalyst layer using a chemical vapor deposition method.

Theoretically, the growth rate of carbon nanotubes is associated with a thickness of the catalyst layer used to grow them on. Under certain conditions for growing carbon nanotubes by a chemical vapor deposition process, the carbon nanotubes grow fastest when the catalyst layer has a certain optimum thickness. When the thickness of the catalyst layer is greater than the optimum thickness, the thicker the catalyst layer is, the slower the carbon nanotubes grow. When the thickness of the catalyst layer is less than the optimum thickness, the thinner the catalyst layer is, the slower the carbon nanotubes grow. If the thickness of the catalyst layer is deliberately controlled during the step of depositing the catalyst layer, so that the thickness gradually changes from a first end to an opposite second end, and somewhere the catalyst layer has a thickness approximately equal to the optimum thickness for growing carbon nanotubes. The carbon nanotubes close to the region of optimum thickness grow faster than other carbon nanotubes far from the region of optimum thickness, so that the carbon nanotubes close to the region of optimum thickness are longer than the other carbon nanotubes after a predetermined growth time. Due to Van der Waals forces of attraction existing between the carbon nanotubes, the carbon nanotube arrays bend in directions deviating from the region of optimum thickness.

Other advantages and novel features will become more apparent from the following detailed description when taken in conjunction with the accompanying drawings, in which:

DETAILED DESCRIPTION OF THE EMBODIMENTS

Figure 1:
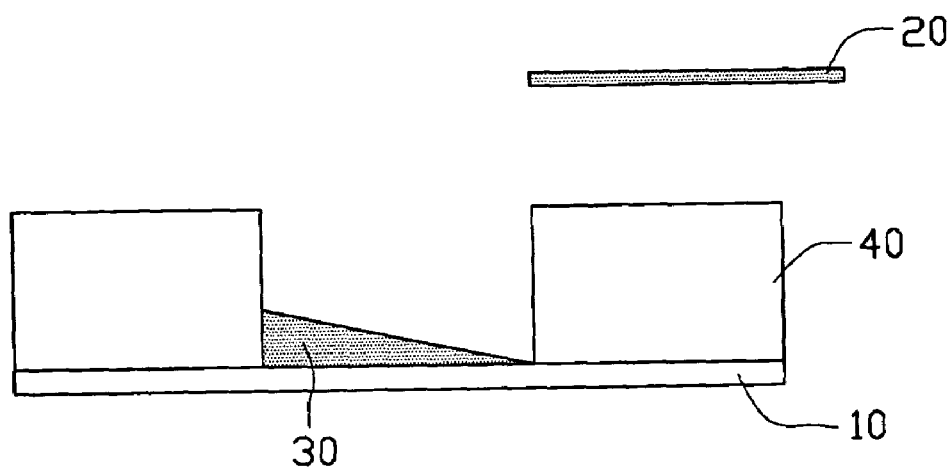
FIG. 1 is a schematic, cross-sectional view of one stage in a procedure for depositing a catalyst layer on a substrate according to a first embodiment of the present invention.

Reference will now be made to the drawings to describe preferred embodiments of the present invention in detail.

Referring to FIGS. 3 to 6, a preferred carbon nanotube-based device 1 according to the first embodiment of the present invention includes a substrate 10, a catalyst layer 30 formed on the substrate 10, and a plurality of carbon nanotube arrays 50, 51 extending from the catalyst layer 30. The substrate 10 is generally made of a material selected from silicon, glass, or metal. The catalyst layer 30 includes material selected from the group consisting of iron, cobalt, nickel, and any suitable alloy thereof. The catalyst layer 30 includes a plurality of catalyst blocks 33, 34. A thickness of each of the catalyst blocks 33, 34 are gradually increases from a first end thereof to an opposite second end thereof. The catalyst blocks 33, 34 each have a region 32 with a thickness approximately equal to an optimum thickness for growing carbon nanotubes. The carbon nanotube arrays 50, 51 are arc-shaped, and bend in respective directions deviating from the region of optimum thickness 32. The carbon nanotubes in the arrays 50, 51 are bundled with each other.

Referring to FIGS. 10 to 14, a carbon nanotube-based device 2 according to the second embodiment of the present invention includes a substrate 70, a catalyst layer 90 formed on the substrate 70, and a plurality of carbon nanotubes arrays 100, 101, 102, 103 extending from the catalyst layer 90. The catalyst layer 90 includes a plurality of catalyst blocks 93, 94, 95, 96. A thickness of each of the catalyst blocks 93, 94, 95, 96 gradually increases from a first end thereof to an opposite second end thereof. The catalyst blocks 93, 94, 95, 96 each have a region 92 with a thickness approximately equal to an optimum thickness for growing carbon nanotubes. The carbon nanotube arrays 100, 101, 102, 103 are arc shaped, and bend in respective directions deviating from the region of optimum thickness 92. The carbon nanotubes in the arrays 100, 101, 102,103 are bundled with each other.

A preferred method for making the carbon nanotube-based device 1 will be described below with reference to FIGS. 1 to 6.

Referring to FIG. 1, the substrate 10 is first provided. Substrate 10 is generally made of porous silicon, polished silicon, glass, or metal. A protection layer 40 is formed on the substrate 10, to allow a selected surface area of the substrate 10 to be exposed to a catalyst source. The protection layer 40 is made of photoresist, metal, metallic oxide, or metallic nitride. The protection layer 40 is easily removed from the substrate 10 later on. A catalyst layer 30 is deposited on the substrate 10. A thickness of the catalyst layer 30 gradually increases from a first end thereof to an opposite second end thereof.

In the preferred embodiment, the catalyst layer 30 is deposited using a thermal evaporation method or an electron beam evaporation method. A catalyst evaporating source 20 is made of iron, and has a linear structure. The catalyst evaporating source 20 is positioned generally above the area where arrays of carbon nanotubes are to be formed, but is not disposed directly above such area. (Such kind of positioning is described hereinafter as being "obliquely above".) Thereby, the catalyst layer 30 having a gradient thickness is obtained. Alternatively, the catalyst evaporating source 20 can also be a point evaporating source, with the point evaporating source and the substrate 10 reciprocally movable along a linear path relative to each other. For instance, the point evaporating source can be linearly movable relative to the substrate 10, or the substrate 10 can be linearly movable related the point evaporating source. The catalyst evaporating source 20 generally includes a material selected from the group of iron, cobalt, nickel, and any suitable alloy thereof.

Figure 2:
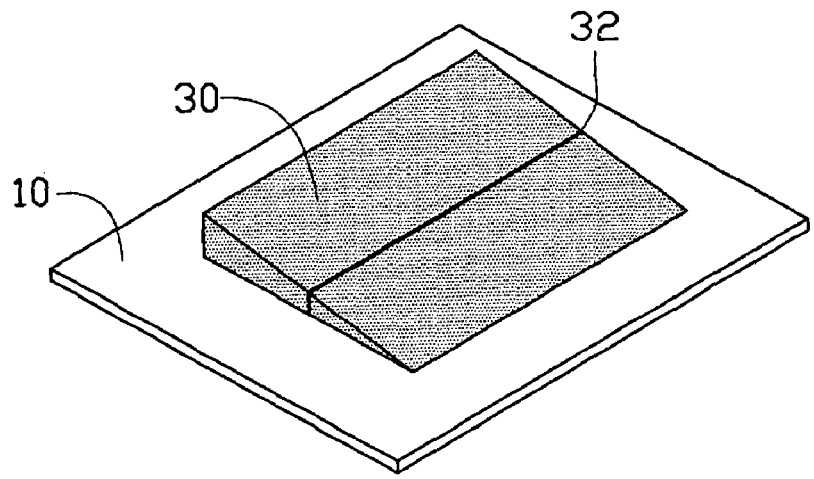
FIG. 2 is an isometric view of the substrate of FIG. 1 with the catalyst layer formed thereon, but showing the substrate after a protection layer has been removed, and further showing a region of optimum thickness of the catalyst layer.

Referring to FIG. 2, after removing the protection layer 40, a location of a region of optimum thickness 32 is marked. That is, under certain conditions for growing carbon nanotubes by a chemical vapor deposition process, the carbon nanotubes grow fastest when the catalyst layer has a certain optimum thickness. If the conditions for growing the carbon nanotubes by the chemical vapor deposition process are predetermined, the optimum thickness can be determined accordingly. In the illustrated embodiment, as an example, the substrate 10 is made of silicon, the catalyst is iron, a carbon source gas is ethylene, a temperature at which the carbon nanotubes are grown is 700 degrees Centigrade, and the optimum thickness of the catalyst layer is about 5 nm.

Figure 3:
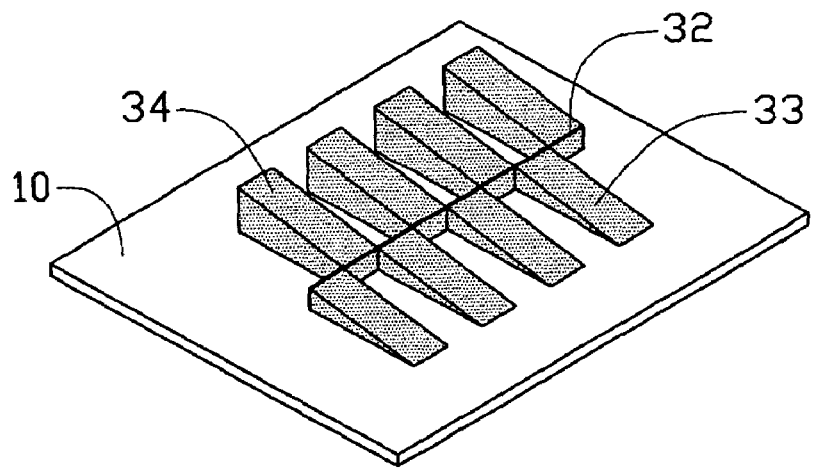
FIG. 3 is similar to FIG. 2, but showing the catalyst layer carved into a plurality of catalyst blocks positioned at opposite sides of the region of optimum thickness.

Referring to FIG. 3, the catalyst layer 30 is formed in a pattern. The pattern includes a plurality of catalyst blocks 33, 34 positioned at opposite sides of the region 32 of optimum thickness 32. A thicker end of the catalyst blocks 33 has a thickness approximately equal to the optimum thickness, and a thinner end of the catalyst blocks 34 has a thickness approximately equal to the optimum thickness. Generally, a thickness of the thicker end of the catalyst blocks 33, 34 is in the range from 5 nm to 20 nm, and a thickness of the thinner end of the catalyst blocks 33, 34 is in the range from 1 nm to 10 nm. In the illustrated embodiment, the pattern is defined using a photolithography method.

In an alternative method for forming the catalyst pattern, a patterned mask is placed adjacent the substrate 10, to allow a selected surface area of the substrate 10 to be exposed to a catalyst evaporating source. An evaporating source is then positioned obliquely above the selected surface area of the substrate 10. After depositing the catalyst layer on the substrate 10 by evaporating the catalyst evaporating source, the mask is removed from the substrate. Alternatively, a patterned photoresist layer instead of the patterned mask can be employed to obtain the same result.

In another alternative method for forming the catalyst pattern, a liquid film containing one or more of the above-mentioned catalyst materials is first coated on the substrate 10 by spray coating, The substrate with the liquid film is spun to form a catalyst layer having a gradient thickness. The pattern is defined by a photolithography method. Unwanted portions of the catalyst layer are then removed.

Figure 4:
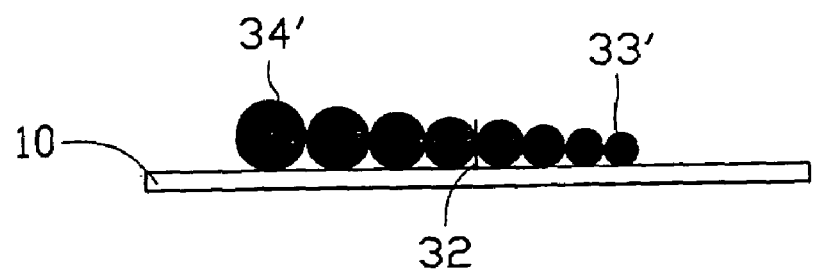
FIG. 4 is an enlarged, side view of the substrate and catalyst blocks of FIG. 3 after treatment, showing the catalyst blocks annealed into a plurality of catalyst particles.

Referring to FIG. 4, the treated substrate 10 with the catalyst blocks 33, 34 is annealed in air at 300~400 degrees Centigrade, thereby oxidizing the catalyst blocks 33, 34 to form nano-sized catalyst oxide particles 33', 34'. Consequently, the thinner a portion of the catalyst blocks 33, 34 is, the smaller the catalyst oxide particles 33', 34' formed from that portion are. Similarly, the thicker a portion of the catalyst blocks 33, 34 is, the larger the catalyst oxide particles 33', 34' formed from that portion are. Thereafter, the treated substrate 10 is placed in a furnace (not shown). A mixture of a carbon source gas and a protective gas is then introduced into the furnace at a predetermined temperature (e.g. 500~900 degrees Centigrade). The carbon source gas can be acetylene, ethylene, methane or any suitable chemical compound containing carbon. The protective gas can be a noble gas or nitrogen. In a preferred method, ethylene is used as the carbon source gas, and argon is used as the protective gas. The protective gas and carbon source gas are introduced at suitable predetermined flow rates respectively (e.g. 80 sccm and 160 sccm).

Figure 5:
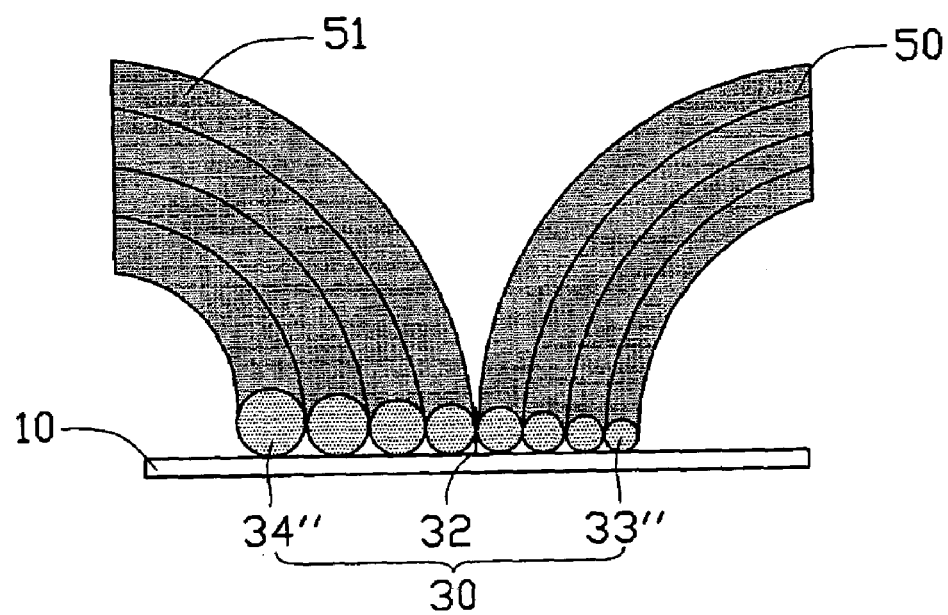
FIG. 5 is an enlarged, side view of a carbon nanotube-based device according to the first embodiment of the present invention, obtained by treating the catalyst particles of the substrate of FIG. 4.

Referring to FIG. 5, the mixture of carbon source gas and protective gas is introduced under these conditions for 5~30 minutes, thus forming the carbon nanotube arrays 50, 51 extending from the substrate 10. In this step, the carbon source gas reduces to carbon and hydrogen, thus the catalyst oxide particles 33', 34' are deoxidized to catalyst particles 33", 34" by the hydrogen. More detailed information on growth of a carbon nanotube array is taught in U.S. Pat. No. 6,232,706 entitled "Self-Oriented Bundles of Carbon Nanotubes and Method of Making Same," which is incorporated herein by reference. Due to Van der Waals forces of attraction existing between the carbon nanotubes, the carbon nanotubes are bundled together, and the carbon nanotube arrays 50, 51 extend in arc shapes bending in directions deviating from the region of the optimum thickness 32.

Figure 6:
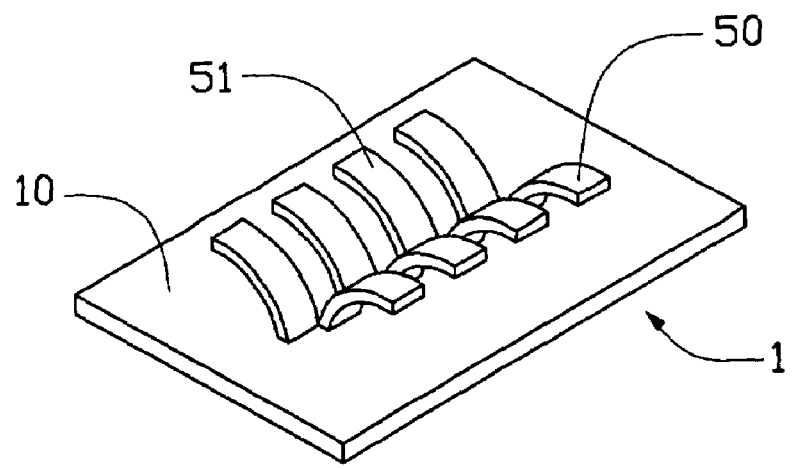
FIG. 6 is an isometric view of the carbon nanotube-based device of FIG. 5.

Referring to FIG. 6, the resultant carbon nanotube-based device 1 includes plural orientations of the carbon nanotube arrays 50, 51.

A preferred method for making the carbon nanotube-based device 2 will be described below with reference to FIGS. 7 to 13.

Figure 7:
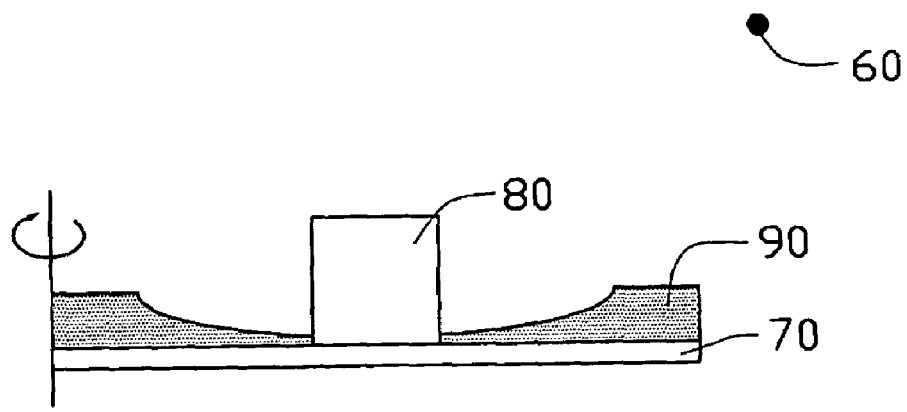
FIG. 7 is a schematic, cross-sectional view of one stage in a procedure for depositing a catalyst layer on a substrate according to a second embodiment of the present invention.

Referring to FIG. 7, the substrate 70 is first provided. The substrate 70 is generally made of porous silicon, polished silicon, glass, or metal. A protection layer 80 is formed on a center of the substrate 70 to allow a deposited around it. The protection layer 80 is a cube or cylinder of photoresist, metal, metallic oxide, or nitride. The protection layer 80 has a suitable height to shelter a catalyst evaporating source 60 in order to obtain the catalyst layer 90 having a gradient thickness. The catalyst layer 90 is deposited on the substrate 70 by a thermal evaporation method or an electron beam evaporation method. The catalyst evaporating source 60 is made of iron, and has a point structure. The catalyst evaporating source 60 is disposed obliquely above a first end of the substrate 70, and the substrate 70 can rotate around an opposite second end thereof. Due to the eccentrically rotating of the substrate 70 and the shelter of the protection layer 80, the catalyst layer 90 defines a gradient thickness beside a center of the substrate 70. The catalyst evaporating source 60 generally includes a material selected from the group consisting of iron, cobalt, nickel, and any alloy thereof.

Figure 8:
FIG. 8 is similar to FIG. 7, but showing the substrate with the catalyst layer formed thereon after a protection layer has been removed, and further showing a region of optimum thickness of the catalyst layer.
Figure 9:
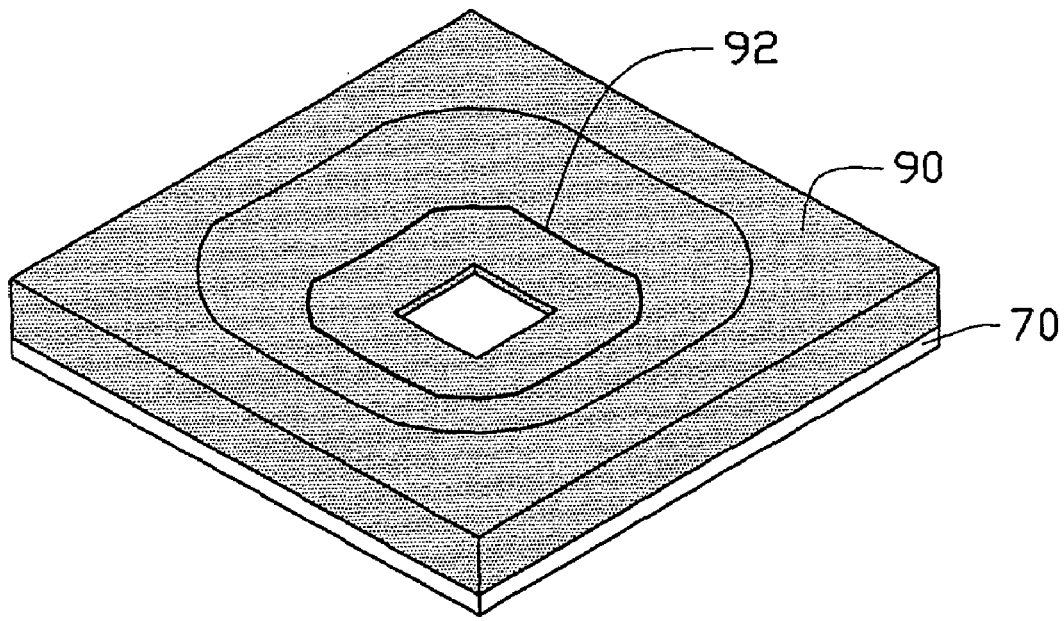
FIG. 9 is an isometric view of the substrate and catalyst layer of FIG. 8.

Referring to FIGS. 8 to 9, after removing the protection layer 80, a location of a region of optimum thickness 92 is marked.

Figure 10:
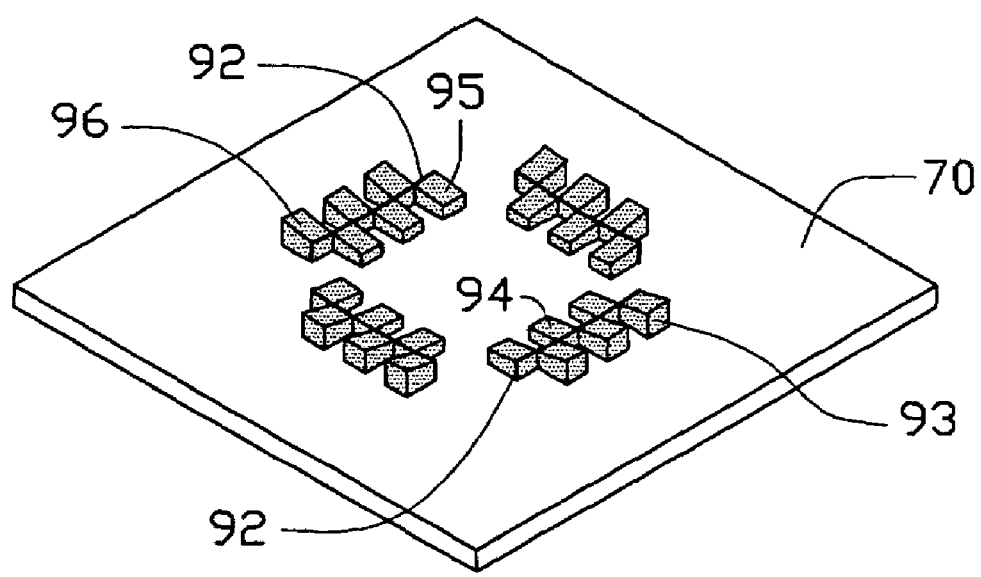
FIG. 10 is similar to FIG. 9, but showing the catalyst layer carved into a plurality of catalyst blocks positioned at opposite sides of the region of optimum thickness.
Figure 11:
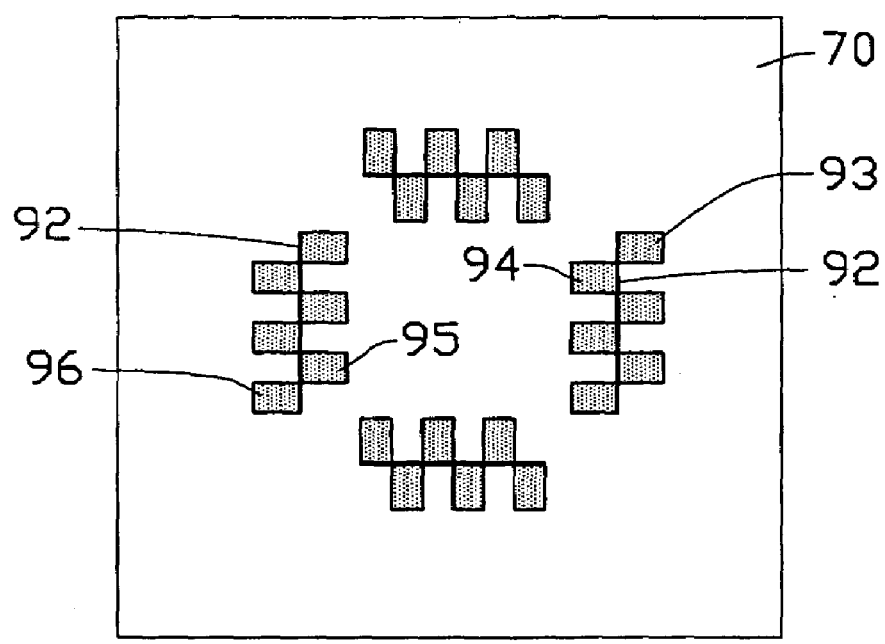
FIG. 11 is a top plan view of the substrate and catalyst blocks of FIG. 10.

Referring to FIGS. 10 and 11, the catalyst layer 90 is formed in a pattern by a photolithography method. The pattern includes a plurality of catalyst blocks 93, 94, 95, 96 arranged at opposite sides of the region of optimum thickness 92. A thicker end of the catalyst blocks 94, 95 has a thickness approximately equal to the optimum thickness, and a thinner end of the catalyst blocks 93, 96 has a thickness approximately equal to the optimum thickness.

Figure 12:
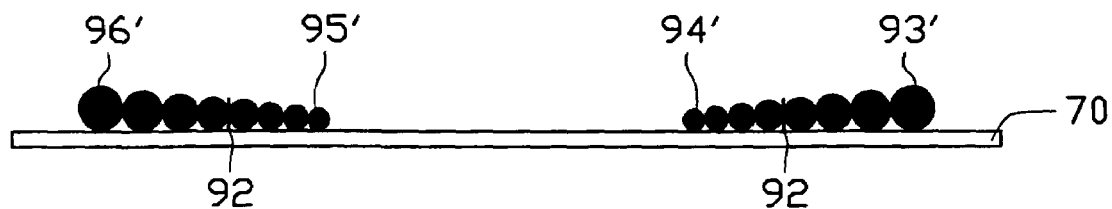
FIG. 12 is an enlarged, side view of the substrate and some of the catalyst blocks of FIG. 10 after treatment, showing the catalyst blocks annealed into a plurality of catalyst particles.

Referring to FIG. 12, the treated substrate 70 with the catalyst blocks 93, 94, 95, 96 is annealed in air at 300~400 degrees Centigrade, thereby oxidizing the catalyst blocks 93, 94, 95, 96 to form nano-sized catalyst oxide particles 93', 94', 95', 96'. Consequently, the thinner a portion of the catalyst blocks 93, 94, 95, 96 is, the smaller the catalyst oxide particles 93', 94', 95', 96' formed from that portion are. Similarly, the thicker a portion of the catalyst blocks 93, 94, 95, 96 is, the larger the catalyst oxide particles 93', 94', 95', 96' formed from that portion are. Thereafter, the treated substrate 70 is placed in a furnace (not shown). A mixture of a carbon source gas and a protective gas is then introduced into the furnace at a predetermined temperature (e.g. 500~900 degrees Centigrade). The carbon source gas can be acetylene, ethylene, methane or any suitable chemical compound containing carbon. The protective gas can be a noble gas or nitrogen. In a preferred method, ethylene is used as the carbon source gas, and argon is used as the protective gas. The protective gas and carbon source gas are introduced at suitable predetermined flow rates respectively (e.g. 80 sccm and 160 sccm).

Figure 13:
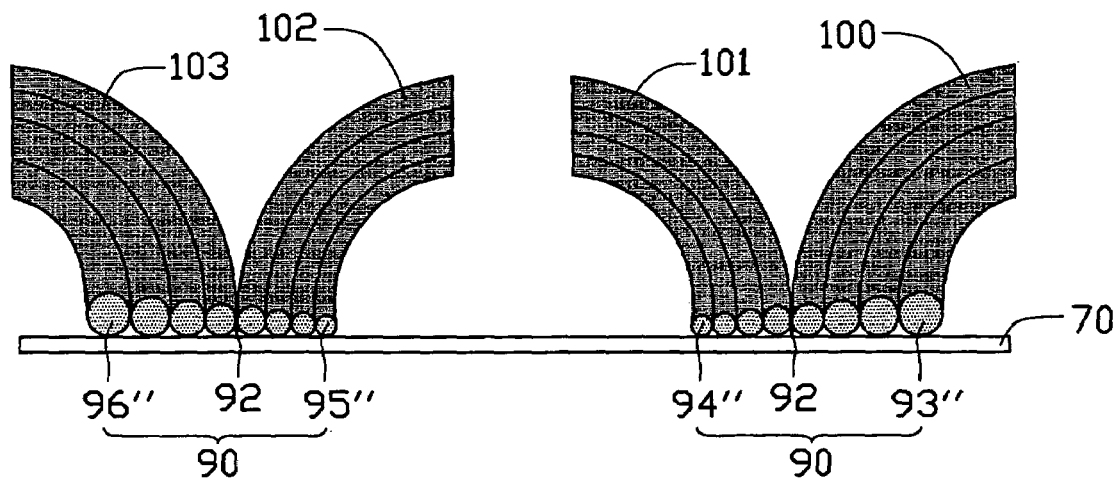
FIG. 13 is an enlarged, side view of part of a carbon nanotube-based device according to the second embodiment of the present invention, obtained by treating the catalyst particles on the substrate of FIG. 12.

Referring to FIG. 13, the mixture of carbon source gas and pretective gas is introduced under these conditions for 5~30 minutes, thus forming the carbon nanotubes arrays 100, 101, 102, 103 extending from the substrate 70. The carbon source gas reduces to carbon and hydrogen, thus the catalyst oxide particles 93', 94', 95', 96' are deoxidized to catalyst particles 93", 94", 95", 96" by the hydrogen. More detailed information on growth of a carbon nanotube array is taught in U.S. Pat. No. 6,232,706 entitled "Self-Oriented Bundles of Carbon Nanotubes and Method of Making Same," which is incorporated herein by reference. Due to Van der Waals forces of attraction existing between the carbon nanotubes, the carbon nanotubes are bundled together and the carbon nanotubes array 100, 101, 102, 103 extend in an arc toward the direction of deviating from the region of the optimum thickness 92.

Figure 14:
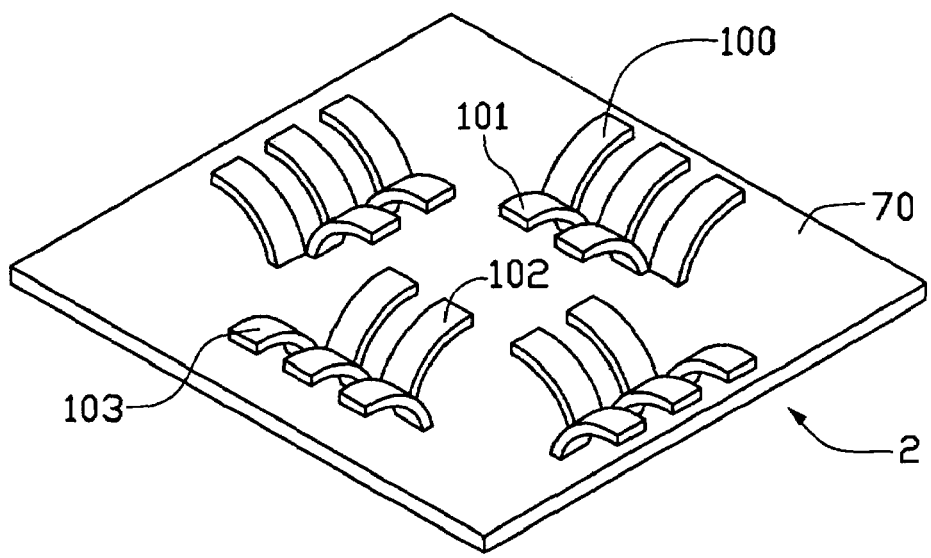
FIG. 14 is an isometric view of all of the carbon nanotube-based device according to the second embodiment of the present invention.

Referring to FIG. 14, the resultant carbon nanotube-based device 2 with plural orientations of the carbon nanotubes arrays 100, 101, 102, 103 is shown.

It is understood that the invention may be embodied in other forms without departing from the spirit thereof. Thus, the present examples and embodiments are to be considered in all respects as illustrative and not restrictive, and the invention is not to be limited to the details given herein.

We claim:

1. A carbon nanotube-based device comprising:
   a substrate;
   a catalyst layer formed on the substrate, the catalyst layer comprising a plurality of catalyst blocks, each catalyst blocks being thicker gradually from a first end thereof to an opposite second end thereof, and the catalyst blocks each having a region with a thickness approximately equal to an optimum thickness for growing carbon nanotubes; and a plurality of carbon nanotube arrays extending from the catalyst blocks, the carbon nanotube arrays being arc-shaped, and bending in respective directions of deviating from the region of optimum thickness.

2. The device as recited in claim 1, wherein the carbon nanotubes are bundled with each other.

3. The device as recited in claim 1, wherein the catalyst layer comprises material selected from the group of iron, cobalt, nickel, or suitable alloy thereof.

4. The device as recited in claim 1, wherein the substrate comprises porous silicon, polished silicon, glass or metal.

5. A carbon nanotube-based structure comprising:
a substrate;
a catalyst layer disposed on the substrate, a thickness of the catalyst layer being varied gradually along a predetermined direction on the substrate, and the catalyst layer having a region with a thickness approximately equal to an optimum thickness for growing carbon nanotubes; and
a carbon nanotube array extending from the catalyst layer, the carbon nanotube array being arc-shaped, and bending in a direction of deviating from the region of optimum thickness.

6. The structure as recited in claim 5, wherein the carbon nanotubes are bundled with each other.

7. The structure as recited in claim 5, wherein the catalyst layer comprises material selected from the group of iron, cobalt, nickel, or suitable alloy thereof.

8. The structure as recited in claim 5, wherein the substrate comprises material selected from the group consisting of silicon, alumina, glass and quartz.

9. A method for making a carbon nanotube-based device, the method comprising the steps of:
providing a substrate;
forming a catalyst layer comprising a plurality of blocks on the substrate, a thickness of the catalyst blocks each being varied gradually from a first end thereof to an opposite second end thereof, and somewhere the catalyst block having a thickness approximately equal to an optimum thickness for growing carbon nanotubes;
introducing a carbon source gas; and
forming a plurality of carbon nanotube arrays extending from the catalyst layer using a chemical vapor deposition method.

10. The method as described in claim 9, further comprising a step of annealing the treated substrate in air to form nano-sized catalyst particles before introducing the carbon source gas.

11. The method as described in claim 9, wherein a thickness of a thinner portion of the catalyst layer is in the range from 1 nm to 10 nm, and a thickness of a thicker portion thereof is in the range from 5 nm to 20 nm.

12. The method as described in claim 9, wherein the step of forming the catalyst layer on the substrate comprising the substeps of:
forming a protection layer on the substrate to allow a selected surface area of the substrate to be exposed to a catalyst evaporating source;
disposing the catalyst evaporating source obliquely above the selected surface area of the substrate;
depositing a catalyst layer on the substrate by evaporating the catalyst evaporating source;
removing the protection layer from the substrate;
marking a region of optimum thickness of the catalyst layer; and
defining the catalyst layer in a pattern, which comprising a plurality of catalyst blocks aligned opposite sides of the region of optimum thickness.

13. The method as described in claim 12, wherein the catalyst evaporating source is selected from the group consisting of iron, cobalt, nickel, and suitable alloy thereof.

14. The method as described in claim 12, wherein the catalyst layer is deposited by a thermal evaporation deposition method or an electron-beam evaporation deposition method.

15. The method as described in claim 12, wherein the catalyst evaporating source has a linear structure.

16. The method as described in claim 12, wherein the catalyst evaporating source is a point evaporating source, the point evaporating source and the substrate are reciprocally movable along a linear path relative to each other.

17. The method as described in claim 12, wherein the catalyst evaporating source is a point evaporating source fixed obliquely above the substrate, the substrate can eccentrically rotate.

18. The method as described in claim 9, wherein the step of forming the catalyst layer on the substrate comprising the substeps of:
forming a patterned mask on the substrate to allow a selected surface area of the substrate to be exposed to a catalyst evaporating source;
disposing the catalyst evaporating source obliquely above the selected surface area of the substrate;
depositing the catalyst layer on the substrate by evaporating the catalyst evaporating source; and
removing the mask from the substrate.

19. The method as described in claim 9, wherein the step of forming the catalyst layer on the substrate comprising the substeps of:
coating a liquid film containing a catalyst on the substrate;
spinning the liquid film to form a catalyst layer having a gradient thickness; and
defining the catalyst layer in a predetermined pattern.

20. A method for controlling forming directions of nanotubes, comprising the steps of:
preparing a substrate used to form nanotubes thereon;
attaching a catalyst layer, having at least two kinds of thickness thereof calculated from said substrate, onto said substrate, a first region of said catalyst layer with one of said at least two kinds of thickness capable of inducing forming of said nanotubes thereon faster than a second region of said catalyst layer with another of said at least two kinds of thickness; and
forming one of said nanotubes on said catalyst layer between said first and second regions thereof to orient said forming of said one of said nanotubes toward a direction defined from said first region of said catalyst layer to said second region of said catalyst layer based on said one and another of said at least two kinds of thickness.

* * * * *